United States Patent [19]

Endo et al.

[11] Patent Number: 4,879,502

[45] Date of Patent: Nov. 7, 1989

[54] SPEED CONTROL APPARATUS AND METHOD FOR MOTORS

[75] Inventors: Tunehiro Endo, Hitachiota; Nobuaki Kato, Katsuta; Kenichi Iizuka, Ashikaga; Fumio Tajima, Ibaraki, all of Japan

[73] Assignees: Hitachi, Ltd.; Hitachi Engineering Co., Ltd., both of Tokyo, Japan

[21] Appl. No.: 192,357

[22] Filed: May 10, 1988

Related U.S. Application Data

[63] Continuation of Ser. No. 822,258, Jan. 24, 1986, abandoned.

[30] Foreign Application Priority Data

Jan. 28, 1985 [JP] Japan .................................. 60-12592
May 31, 1985 [JP] Japan ................................. 60-116451

[51] Int. Cl.[4] ............................................. H02P 5/40
[52] U.S. Cl. ..................................... 318/723; 318/808
[58] Field of Search ................ 318/138, 254, 722, 723

[56] References Cited

U.S. PATENT DOCUMENTS

| | | | |
|---|---|---|---|
| 3,939,387 | 2/1976 | Maeda | 363/37 |
| 4,249,116 | 2/1981 | Hieda | 318/254 |
| 4,270,074 | 5/1981 | Duckworth et al. | 318/254 |
| 4,479,078 | 10/1984 | Kido et al. | 318/254 |
| 4,495,450 | 1/1985 | Tokizaki et al. | 318/254 |
| 4,507,590 | 3/1985 | Miyazaki | 318/254 |
| 4,532,461 | 7/1985 | Crook | 318/254 |
| 4,544,868 | 10/1985 | Murty | 318/254 |
| 4,546,293 | 10/1985 | Peterson et al. | 318/254 |
| 4,571,668 | 2/1986 | Azusawa et al. | 318/345 C |
| 4,573,002 | 2/1986 | Kurakake et al. | 318/722 |
| 4,821,276 | 7/1988 | Cutler et al. | 318/803 |

Primary Examiner—David Smith, Jr.
Attorney, Agent, or Firm—Antonelli, Terry & Wands

[57] ABSTRACT

In speed control apparatus and method for a motor operable to drive a load whose magnitude varies over a predetermined period which use a unit for controlling voltage or current supplied to the motor such that the speed of the motor can coincide with a command speed, n pieces of data indicative of voltages or currents supplied to the motor and corresponding to n divisions of the predetermined period are independently stored in a read/write storage, at least one of the n pieces of data is corrected at the rate of each of the n divisions in accordance with a difference between the command speed and the speed of the motor, and the voltage or current supplied to the motor is controlled in accordance with at least the one of the n pieces of data, so that pulsation and noise occurring especially under low revolutions can be minimized.

12 Claims, 11 Drawing Sheets

F I G. 9

| MODE | "1" | "2" | "3" | "4" | "5" | "6" | "7" | "8" | "9" | "10" | "11" | "12" |
|---|---|---|---|---|---|---|---|---|---|---|---|---|
| | 0  30° | 60° | 90° | 120° | 150° | 180° | 210° | 240° | 270° | 300° | 330° | 360° |
| SPEED IN EACH MODE | N1 | N2 | N3 | N4 | N5 | N6 | N7 | N8 | N9 | N10 | N11 | N12 |
| DETECTED SPEED | N12 | N1 | N2 | N3 | N4 | N5 | N6 | N7 | N8 | N9 | N10 | N11 |
| CURRENT DATA FOR CONVERSION | I12 | I1 | I2 | I3 | I4 | I5 | I6 | I7 | I8 | I9 | I10 | I11 |
| | P12 | P1 | P2 | P3 | P4 | P5 | P6 | P7 | P8 | P9 | P10 | P11 |
| CURRENT OUTPUT DATA | I1+P1 | I2+P2 | I3+P3 | I4+P4 | I5+P5 | I6+P6 | I7+P7 | I8+P8 | I9+P9 | I10+P10 | I11+P11 | I12+P12 |

SPEED CONTROL APPARATUS AND METHOD FOR MOTORS

This application is a continuation of application Ser. No. 822,258, filed Jan. 24, 1986, now abandoned.

BACKGROUND OF THE INVENTION

1. Field of the Invention

This invention relates to a speed control apparatus for a motor which is particularly suitable for a motor driving a load which varies at a predetermined period. The invention also pertains to a speed control method for such a motor.

Since a brushless DC motor is typically used for driving loads which tend to vary, this invention specifically relates to a method of controlling speeds of the brushless DC motor by measuring the revolution period from a position detection signal and computing the revolution number.

Typically, this invention is suitably applied to a motor for driving a compressor.

Recently, in order to change cooling or heating capability of room air conditioners, a control apparatus has typically been available which controls the revolution number of a motor for driving a compressor by using an inverter.

The revolution number of this type of motor can be controlled within a range from about 2,000 rpm to about 6,000 rpm.

It is expected that if the controllable range of the revolution number is further extended, then control performance for conditioning the room air increases over a wider range so that heating capability can be enhanced under high revolutions and power consumption and noise can advantageously be reduced under low revolutions.

2. Description of the Related Art

Conventionally, however, running of the motor at a low revolution of about 1,000 rpm difficult to practice because vibration and noise increase for the reasons described below.

More particularly, a compressor used for room air conditioner or a refrigerator is typically housed hermetically together with the drive motor in a chamber and irrespective of the type of the compressor, rotary or reciprocation type, load torque applied to the compressor motor greatly pulsates in relation to revolving positions, attended with maximum loading torque amounting up to about thrice average loading torque, and the pulsation repeats at a period of one revolution.

Reference should then be made to FIG. 15 which graphically illustrates changes in load torque $T_L$, output torque $T_M$ of the motor and revolution number N in relation to revolving angles of the motor.

In a revolving angle region designated by B where the load torque $T_L$ exceeds the output torque $T_M$, an angular acceleration due to a decrease in the revolution number N takes place with the result that revolving inertial torque represented by a product of the angular acceleration and a moment of inertia J owned by a rotary axis system of the motor occurs which cooperates with the output torque $T_M$ to balance with the load torque $T_L$.

Conversely, in a revolving angle region designated by A where $T_L < T_M$, revolving inertial torque due to an increase in the revolution number takes place. Thus, the revolving inertial torque corresponds to a torque difference $T_M - T_L$ and as a result, balance in torque is maintained between the output motor and the loading compressor.

Consequently, in the motor driven compressor, the revolving pulsation occurs during one revolution, causing vibration and noise throughout the compressor chamber.

Especially, when running speed of the motor extends to low revolutions, a decreased revolution number causes the amplitude of the revolving pulsation to increase and the frequency thereof to decrease if an angular acceleration equivalent to that under high revolutions occurs.

This leads to occurrence of a vibration whose amplitude increases with the revolving pulsation and frequency decreases therewith.

Conventionally, the extension of the range of revolution number of the compressor motor to low revolutions has therefore required bulky vibration and noise preventive devices against the magnified vibration and noise and has been difficult to practice.

A torque control apparatus developed by the present inventors to solve the above problems is seen in, for example, Japanese Pat. Application No. 123639/84, according to which a pattern of load torque is stored in advance and the stored torque pattern data is read at the rate of a predetermined revolving angle to control output torque.

This apparatus is however based on a premise that the load torque pattern related to revolving angles is known and is therefore sufficient as far as this premise is met, but it is still unsatisfactory facing problems of inflexibility of patterning to a desired load torque pattern and necessity of detection of a reference position relative to the revolving angles, thus leaving behind tasks to be studied.

To control speeds of the brushless motor, a method has been proposed as disclosed in Japanese Pat. Unexamined Publication No. 44991/84, which comprises five processings respectively directed to measurement of time for each 60° electrical angle from a position detection signal, computation of a time for 60 $n_1$ electrical angle where $n_1$ is a positive integer, computation of a revolution number from the computed time, computation of proportional, integration and differential terms of a difference revolution number between the computed and so detected revolution number and a command revolution number, and determination of an output voltage of an inverter based on the difference revolution number. However, the measurement of the time for 60° electrical angle is asynchronous with the ensuring processings. To be specific, the determination of the inverter output voltage following the computation of the time for 60° electrical angle is based on the computed time and is retarded from the computing processing, thus leading to a problem that response speed of a speed control system is decreased.

Especially, problems encountered in using the brushless DC motor, controlled by the conventional speed control method, as the compressor motor are as follows. More particularly, as described previously, the compressor used for a room air conditioner or a refrigerator is typically housed hermetically together with the drive motor in the chamber and in any of rotary type compressor and reciprocation type compressor, the load torque applied to the compressor motor greatly pulsates in relation to revolving positions, so that the maximum load torque amounts up to about thrice the average load torque. And, the pulsating load has a pattern almost determined relative to the revolving angles. This accounts for the fact that as far as speed controlling is effected asynchronously with the position detection signal synchronous with the revolving angles as in the conventional speed controlling, it is difficult to determine the inverter output voltage in quick response to the load changeable with the revolving angles and consequently, the difference between the motor output torque and load torque is increased to generate the revolving pulsation whose amplitude is increased and frequency is decreased under low revolutions, causing magnified vibrations throughout the chamber.

SUMMARY OF THE INVENTION

A first object of this invention is to provide a speed control apparatus for a motor applied with a load such as a compressor which varies at a predetermined period to pulsate, wherein corresponding pulsation in the speed of the motor can be minimized and the speed can be controlled over a wide range without resort to detection of any reference position.

A second object of this invention is to provide a speed control method for a brushless DC motor capable of controlling the speed of the motor in quick response to changes in a load even when the load changes in relation to revolving positions.

To accomplish the first object, according to the invention, there is provided a speed control apparatus for a motor operable to drive a load which varies over a predetermined period comprising a unit for controlling voltage or current supplied to the motor such that he speed of the motor can coincide with a command speed, wherein the speed control apparatus comprises read/write storage means for independently storing n pieces of data indicative of voltages or currents supplied to the motor and corresponding to n divisions of the predetermined period, and means responsive to a difference between the command speed and the speed of the motor for correcting at the rate of each of the n divisions at least one of the n pieces of data and controlling the voltage or current supplied to the motor in accordance with at least the one of the n pieces of data.

To explain, according to one aspect of the invention, since the load repeats to pulsate or change over the predetermined period, this period is divided into n divisions and the n pieces of data are provided which are indicative of currents or voltages supplied to the motor at the rate of the respective divisions. The data is corrected at the rate of the predetermined period on the basis of the difference between the command speed and detection speed for the motor for each of the n divisions and used to control the current or voltage supplied to the motor.

Particularly, to explain the invention by way of the motor for compressors, in consideration of the fact that, in this type of motor, vibration and noise are magnified under low revolutions owing to non-coincidence between load torque and output torque of the motor in relation to revolving angles, speed controlling is so effected as to make the motor output torque coincident with the load torque.

Thus, a specified conceivable expedient directed to detection of the load torque without relying upon detection of any reference position is such that one revolution or period of change of load is divided into n divisions, n pieces of data indicative of the torque are independently prepared at the rate of the respective divisions on the basis of the difference between the command speed and the detection speed to provide an estimated load torque pattern over one revolution, and the motor torque based on the n pieces of data is delivered out.

To accomplish the second object of the invention, according to the invention, there is provided a speed control method for a motor especially a permanent magnet rotor type synchronous motor standing for a brushless DC motor in which the synchronous motor is driven by an output signal from an inverter for DC to three-phase AC power conversion, positions of magnetic poles of the rotor are detected to produce position detection signals, a fundamental signal is prepared from the position detection signals which occurs at the rate of an electrical angle of $60 n_1$ degrees where $n_1$ is a positive integer, a revolution number is detected from the period of the fundamental signal, and an output voltage of the inverter is determined in accordance with the detected revolution number and a command revolution number to effect speed controlling, wherein the speed control method comprises the steps of making the determination of the inverter output voltage synchronous with the position detection signals and executing the determination of the inverter output voltage at the rate of a time for an electrical angle of $60 n_2$ degrees where $n_2$ is a positive integer.

To explain, according to another aspect of the invention, the time for each $60 n_1$ electrical angle is measured from the detection signals of revolving positions of the rotor where $n_1$ is a positive integer, the revolution number is computed from the measured time at the rate of the time for $60 n_2$ electrical angle where $n_2$ is positive integer, and proportional, integration and differential terms of a difference revolution number between the computed and so detected revolution number and the command revolution number are used to determine the inverter output voltage to thereby make the position detection signals synchronous with the speed controlling.

BRIEF DESCRIPTION OF THE DRAWINGS

FIG. 9 is a diagram useful in explaining the operation in the speed controlling shown in FIG. 8;

DESCRIPTION OF THE PREFERRED EMBODIMENTS

Preferred embodiments of a speed control apparatus for a motor according to the present invention will now be described with reference to FIGS. 1 to 9.

In each embodiment, a brushless DC motor for a compressor is exemplarily used as the motor to be controlled.

Figure 1:
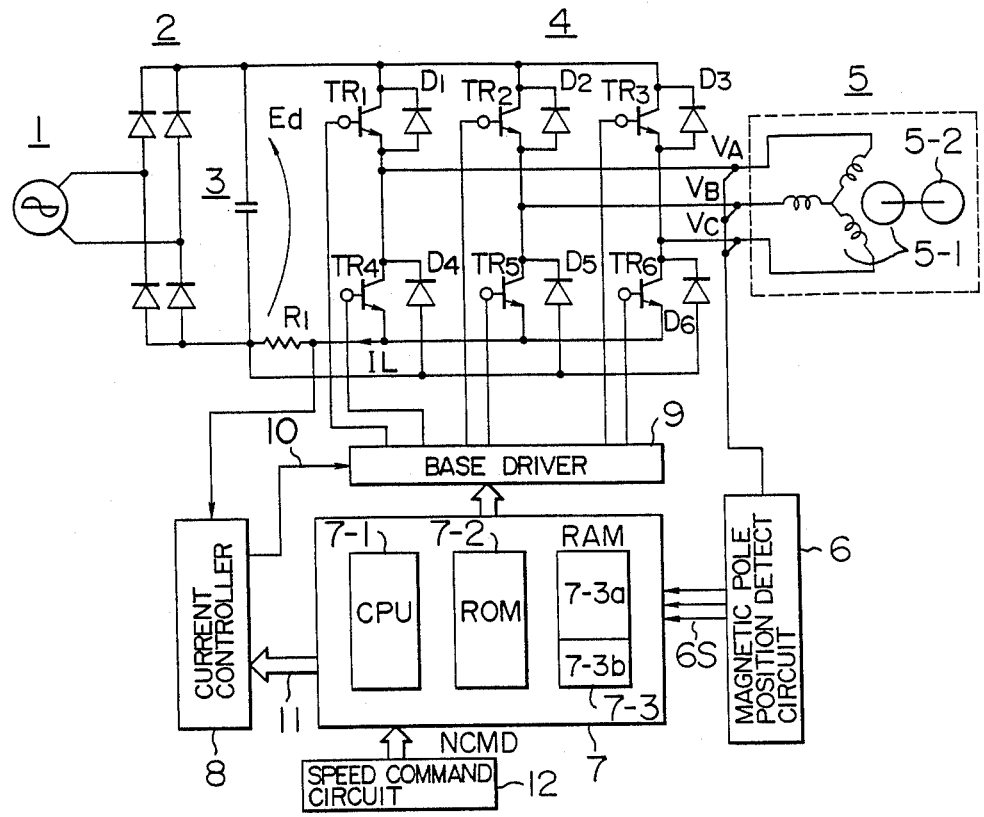
FIG. 1 schematically shows, in circuit diagram form, a speed control apparatus for a motor according to an embodiment of the invention.

Thus, FIG. 1 shows the overall construction of a speed control apparatus for the brushless DC motor.

Referring then to FIG. 1, an AC voltage fed from an AC power source 1 is converted by a rectifier circuit 2 and a smoothing capacitor 3 into a DC voltage Ed which in turn is supplied to an inverter 4.

The inverter 4 is a 120° conduction type inverter comprised of transistors $TR_1$ to $TR_6$ and freewheeling diodes $D_1$ to $D_6$. The transistors $TR_1$ to $TR_3$ on the positive potential side of the DC voltage Ed undergo chopper operations to control their conducting periods (electrical angles of 120°) under the control of pulse width modulation, thereby controlling the AC output voltage of the inverter.

A low resistance resistor $R_1$ is connected between a common emitter terminal of the transistors $TR_4$ to $TR_6$ and a common anode terminal of the freewheeling diodes $D_4$ to $D_6$.

A compressor unit 5 includes a synchronous motor 5-1 with a four-pole permanent field magnet, standing for a brushless DC motor, and a compressor 5-2 loaded on the synchronous motor 5-1.

Currents flowing in armature windings of the synchronous motor 5-1 also flow through the low resistance resistor $R_1$ and a voltage drop thereacross is detected to measure a winding current $I_L$.

A control circuit adapted to control speeds of the synchronous motor 5-1 comprises a microcomputer 7, a magnetic pole position detecting circuit 6 for detecting positions of magnetic poles of a rotor of the synchronous motor 5-1, a current controller 8 for controlling the armature winding current of the synchronous motor 5-1, a base driver 9 for the transistors $TR_1$ to $TR_6$, and a speed command circuit 12 for transmitting a speed command NCMD indicative of a speed of the synchronous motor 5-1 to the microcomputer 7.

The magnetic pole position detecting circuit 6 has a filter circuit which responds to armature winding terminal voltages $V_A$ to $V_C$ to produce position detection signals 6S indicative of a rotor revolving position. By using the position detection signals 6S, the microcomputer 7 performs an arithmetic operation to determine a revolution speed of the synchronous motor 5-1.

The microcomputer 7 comprises a central processing unit (CPU) 7-1, a ROM 7-2 and a RAM 7-3 which are respectively coupled to an address bus, a data bus and a control bus which are not illustrated in the drawing.

The ROM 7-2 stores various processing programs necessary for driving the synchronous motor 5-1 standing for the brushless DC motor, the programs being directed to, for example, a speed arithmetic operation processing, a command fetching processing and a speed control processing.

The RAM 7-3, on the other hand, includes a main storage area 7-3a for read/write of various data required for execution of the various processing programs and a current pattern storage area 7-3b for storing 12 pieces of current data relevant to values of currents to be passed through the windings each time the rotor takes respective revolving positions.

In accordance with a current output data 11 outputted, at every revolving position, from the microcomputer 7 on the basis of a current data in the current pattern storage area 7-3b, the current controller 8 controls the winding current $I_L$. Reference numeral 10 designates a chopper signal to be described later.

Since in the brushless DC motor the winding current flowing in the armature winding corresponds to output torque of the motor, the output torque can be controlled at every revolving position by controlling the winding current at every revolving position.

Figure 2:
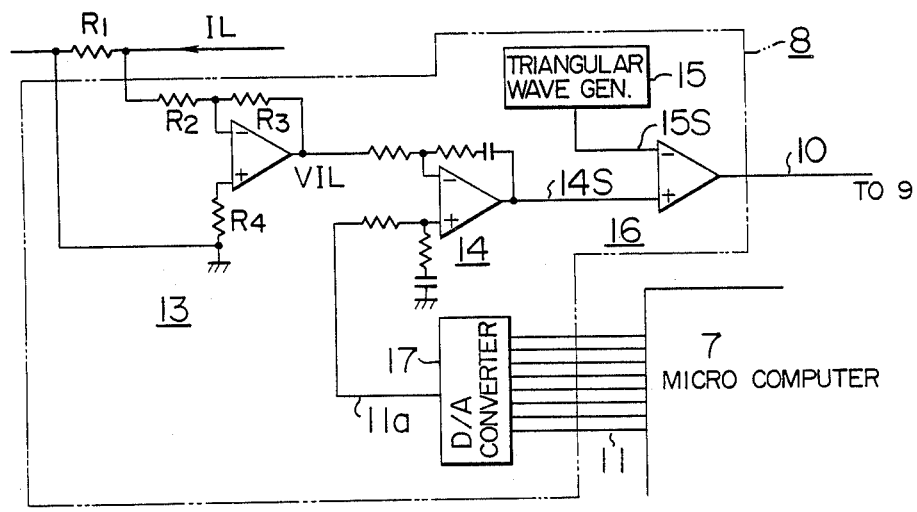
FIG. 2 is a circuit diagram showing details of a current controller.

Details of the current controller 8 are shown in FIG. 2.

More particularly, the current controller 8 comprises a D/A converter 17 serving as a current command circuit, an amplifier 13 acting as a current detector circuit, a current comparator 14 for comparing a current command value 11a and a current detection value $V_{IL}$, a triangular wave generator 15, and a comparator 16 for preparing the chopper signal 10 necessary for chopper operations of the transistors $TR_1$ to $TR_3$. The current data is read one by one in accordance with a revolving position from the 12 pieces of current data stored in the current pattern storage area 7-3b of the RAM 7-3 included in the microcomputer 7, thereby providing a current output data 11 of 8 bits delivered out of the microcomputer 7. The thus outputted data 11 is converted by the D/A converter 17 into an analog signal representative of the current command value 11a.

The winding current $I_L$ obtained as a voltage drop across the low resistance resistor $R_1$ is amplified by the amplifier 13 to provide the current detection value $V_{IL}$ which in turn is compared at the current comparator 14 with the current command value 11a. An output signal 14S from the current comparator 14 is compared with a triangular wave signal 15S outputted from the triangular wave generator 15 at the comparator 16, which produces an output signal as the chopper signal 10.

Figure 3:
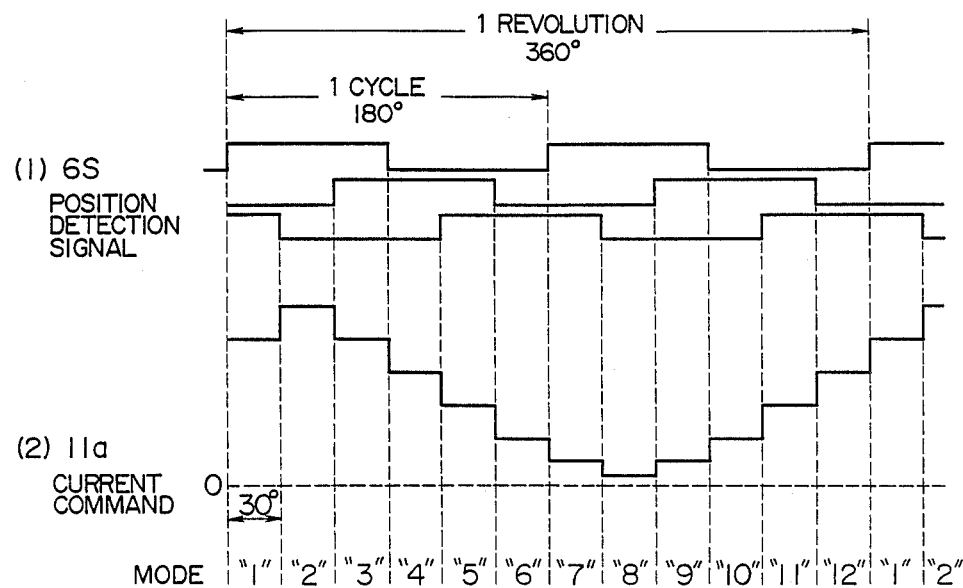
FIG. 3 is a diagram for explaining the operation of the apparatus shown in FIG. 1.

Time relationship between the position detection signal 6S and the current command value 11a is shown in FIG. 3 which is useful in explaining the operation of the apparatus shown in FIG. 1.

Due to the fact that the synchronous motor 5-1 has four poles, the position detection signal 6S representative of the magnetic pole position of the rotor has one cycle which corresponds to a mechanical angle of 180° as shown at (1) in FIG. 3, and one revolution of the rotor over 360° is divided at the rate of 30° into 12 modes ranging from mode "1" to mode "12" as shown in FIG. 3.

Twelve pieces of 8-bit current data prepared for the respective modes in a manner to be described later and stored in the current pattern storage area 7-3b are read out in accordance with the respective modes. The current output data 11 outputted on the basis of the thus read-out current data is converted by the D/A converter 17 into the current command value 11a as shown at (2) in FIG. 3.

Then, as described previously, the current detection value $V_{IL}$ is compared with the current command value 11a to produce the chopper signal 10 so that the winding current $I_L$ can be controlled in compliance with the waveform of the current command value.

One embodiment of a method of correcting or updating and outputting the 12 pieces of current data stored in the current pattern storage area 7-3b will now be described with reference to FIGS. 4 and 5.

Figure 4:
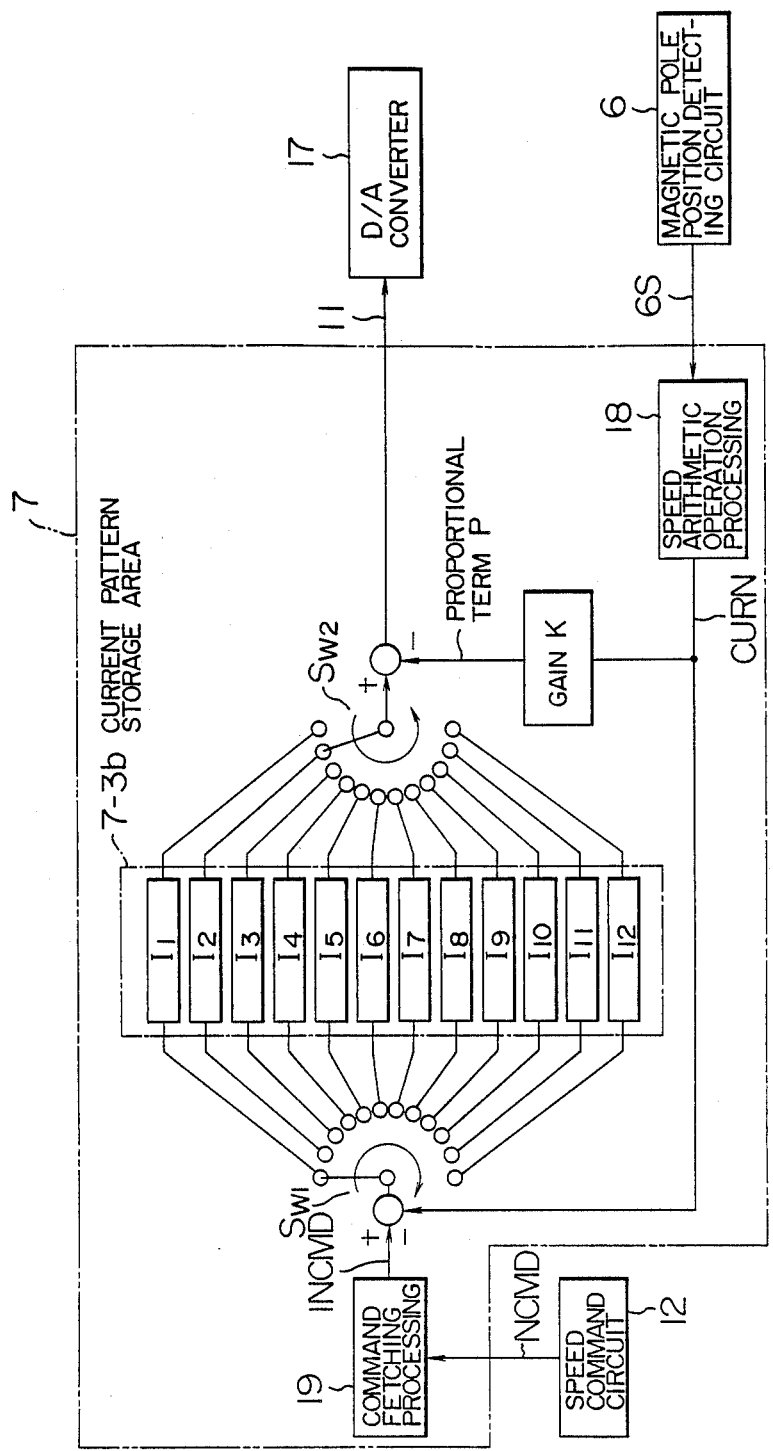
FIG. 4 is a block diagram detailing an embodiment of speed controlling with the apparatus of FIG. 1.

According to this embodiment, the microcomputer 7 performs processings contents of which are detailed in block form in FIG. 4.

The position detection signal 6S from the magnetic pole position detecting circuit 6 and the speed command NCMD from the speed command circuit 12 are inputted to the microcomputer 7.

Thus, during a speed arithmetic operation processing 18, a time for revolution of the rotor for each mechanical angle 30° or each of the n division which is derived from the position detection signal 6S is used for determining a speed through an arithmetic operation.

During a command fetching processing 19, the speed command NCMD is read to prepare an internal speed command INCMD.

The current pattern storage 7-3b described previously contains 12 integration terms $I_1$ to $I_{12}$ as shown in FIG. 4 which are relevant to the current data.

Specifically, $I_i = \Sigma(\text{INCMD} - N_i)$ is defined where Ni denotes a revolution speed at a mode "i".

A switch $SW_1$ is operative to select either one of the 12 integration terms on the input side and a switch $SW_2$ is also operative to select either one of the 12 integration terms on the output side. The two switches $SW_1$ and $SW_2$ are switched over each time the rotor rotates by the mechanical angle of 30°.

A proportional term P as shown in FIG. 4 is subtracted from an integration term selected by the switch $SW_2$ and a difference is outputted to the D/A converter 17 as a current output data 11. The proportional term P herein is represented by P=K·CURN, where "CURN" denotes a speed computed and detected during the speed arithmetic operation processing 18 and "K" denotes a proportional term gain.

Figure 5:
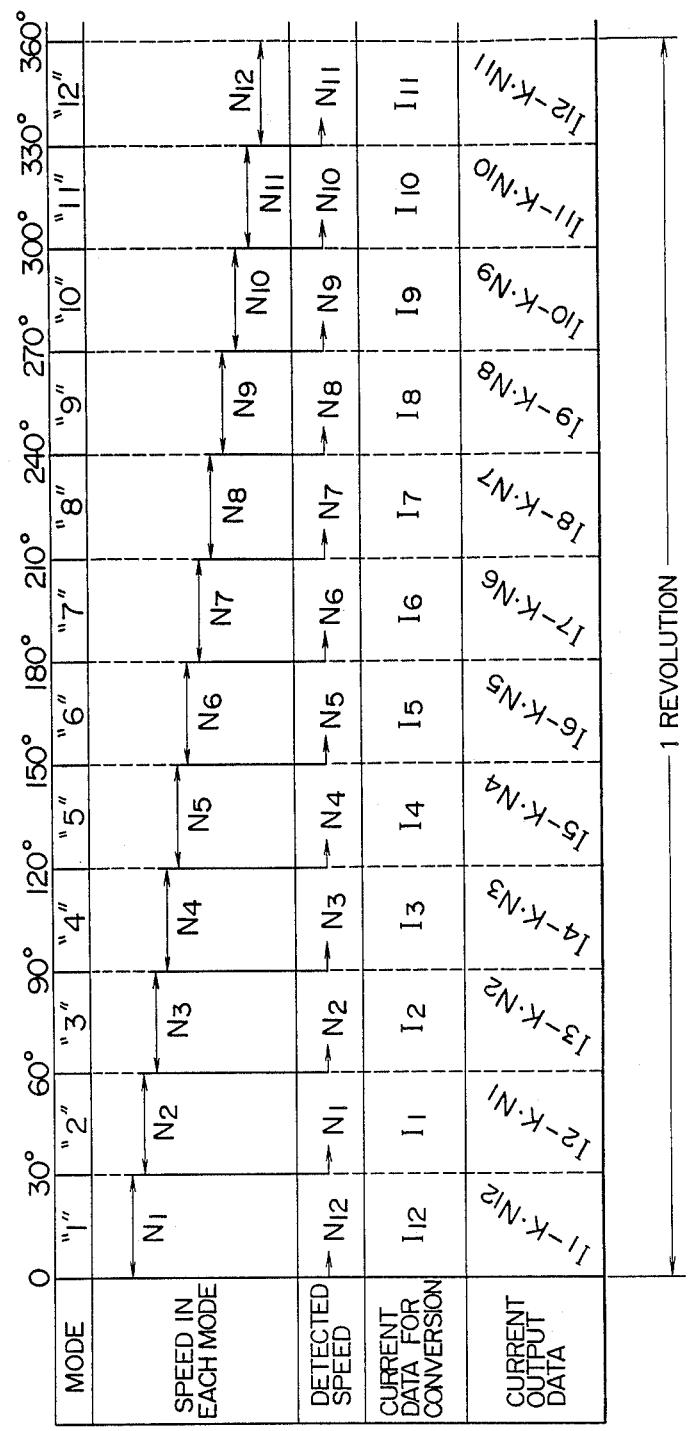
FIG. 5 is a diagram for explaining the operation in the speed shown in FIG. 4.

FIG. 5 shows detection speeds, corrected integration terms (i.e., current data) and current output data at the respective modes "1" to "12" set up by dividing one revolution of 360° at the rate of 30° as shown in FIG. 3 and is useful to explain the operation of the apparatus.

When the rotor reaches a position corresponding to a mode "i" at a given time t, a revolution speed $N_{i-1}$ relevant to one preceding mode "i−1" (for i=1, mode "12") is detected at the mode "i", and the detected speed Ni−1 and an internal speed command INCMD at a corresponding instant (i.e., at the mode "i") are used to correct or update an integration term $I_{i-1}$ in accordance with the following equation:

$$I_{i-1} = (\text{INCMD} - N_{i-1}) + I_{i-1} \qquad (1)$$

In equation (1), an integration term $I_{i-1}$ in the right side represents an integration term as determined prior to the corresponding instant. In general, as described previously, the integration term $I_i$ for the mode "i" is pursuant to $$I_i = \Sigma(\text{INCMD} - N_i) \qquad (2)$$

A current output data at the mode "i" is represented by a difference between an integration term $I_i$ which has been corrected at a mode "i+1" that precedes by about one revolution and a proportional term $P=KN_{i-l}$, resulting in $I_i = K \cdot N_{i-1}$.

As described above, one revolution of 360° is divided into 12 revolving positions at the rate of 30°, integration terms representative of independent current data for the divisions of positions are stored in an area of the read/write RAM, and an integration term at each revolving position is prepared and rewritten in the area of the read/write RAM in accordance with from a difference between a speed and a command speed at that revolving position obtained by comparing the speed and the speed command. Consequently, a pattern of one revolution of 360° representing a period of load change consisting of 12 integration terms approximates a pulsating pattern representative of a change of load on the compressor.

At a mode "i" corresponding to a given position, the microcomputer 7 performs, as described previously, a processing wherein a speed is computed and an integration term is corrected in connection with one preceding mode "i−1", and a current output data to be delivered out is prepared on the basis of an integration term $I_i$ which has already been corrected at a mode that precedes about one revolution and a proportional term P obtained from a speed computed at the mode "i".

As will be seen from the above, as far as the respective 12 integration terms are merely updated or rewritten at the rate of one revolution and the thus updated integration terms are reflected in the current output data after about one revolution, response of the integration term to a rapid change may be retarded.

In consideration of this retardation, according to the above embodiment, the proportional term is employed to reflect a speed detected at a mode that precedes a given mode by one in the current output data in order to compensate for a retarded response of the integration term and consequently to increase response of the current output data.

Another embodiment of a method of preparing current data to be stored in the current pattern storage area will be described with reference to FIGS. 6 and 7. In these figures, identical parts to those in FIGS. 4 and 5 are designated by identical reference numerals, with a microcomputer and a current pattern storage area being denoted by 7-A and 7-3b-1, respectively.

This embodiment is different from the embodiment shown in FIGS. 4 and 5 in that the twelve modes over one revolution is combined into sets of two modes of a mechanical angle of 60° a the current data is corrected by a revolving speed over the two modes.

Figure 6:
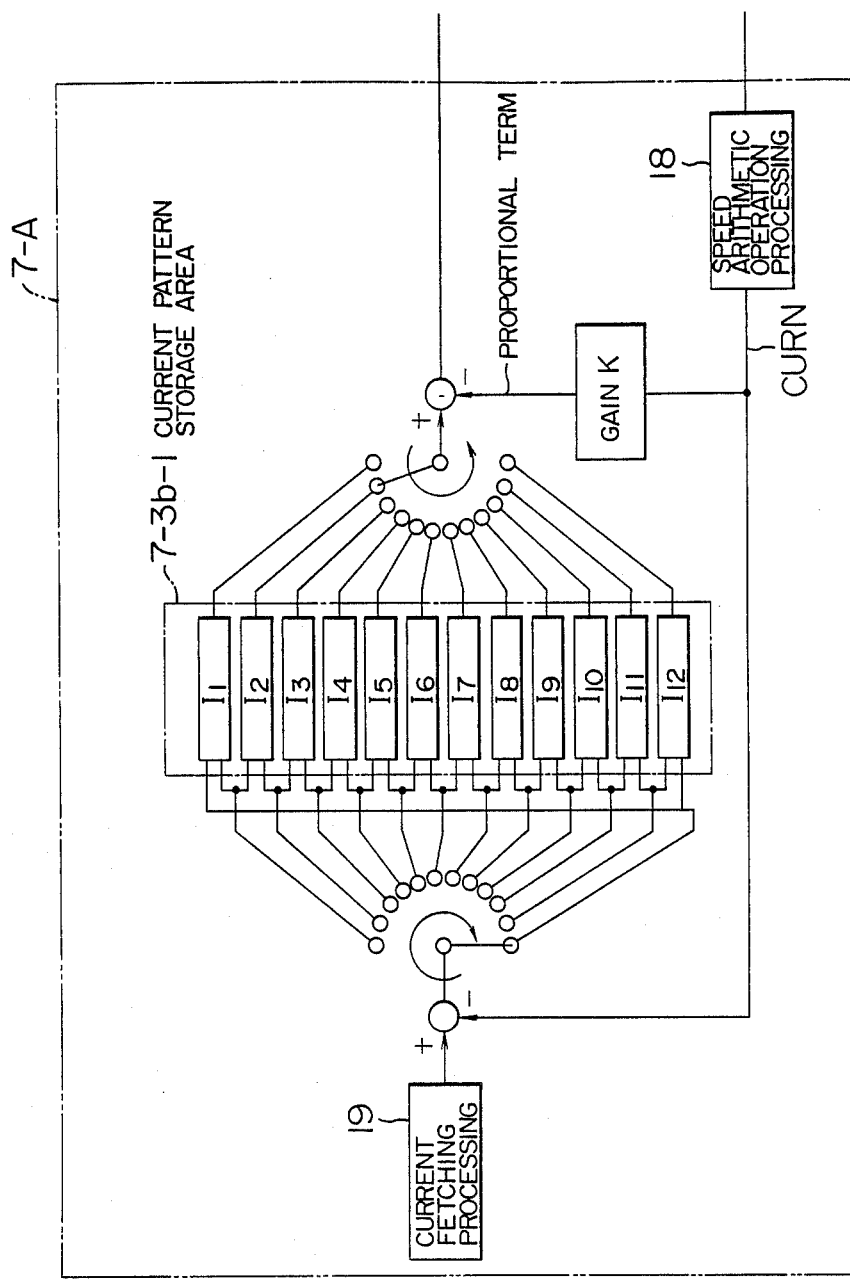
FIG. 6 a block diagram detailing another embodiment of speed controlling with the FIG. 1 apparatus.

Like FIG. 4, FIG. 6 shows, in block form, details of contents of processings performed with the microcomputer 7-A.

Specifically, two integration terms representative of current data are corrected on the basis of a difference between an internal speed command INCMD produced during the command fetching 19 and a speed CURN computed and detected during the speed arithmetic operation processing 18, both the processings being effected for each mechanical angle of 30°, and a single integration term is reflected in the current output data.

Figure 7:
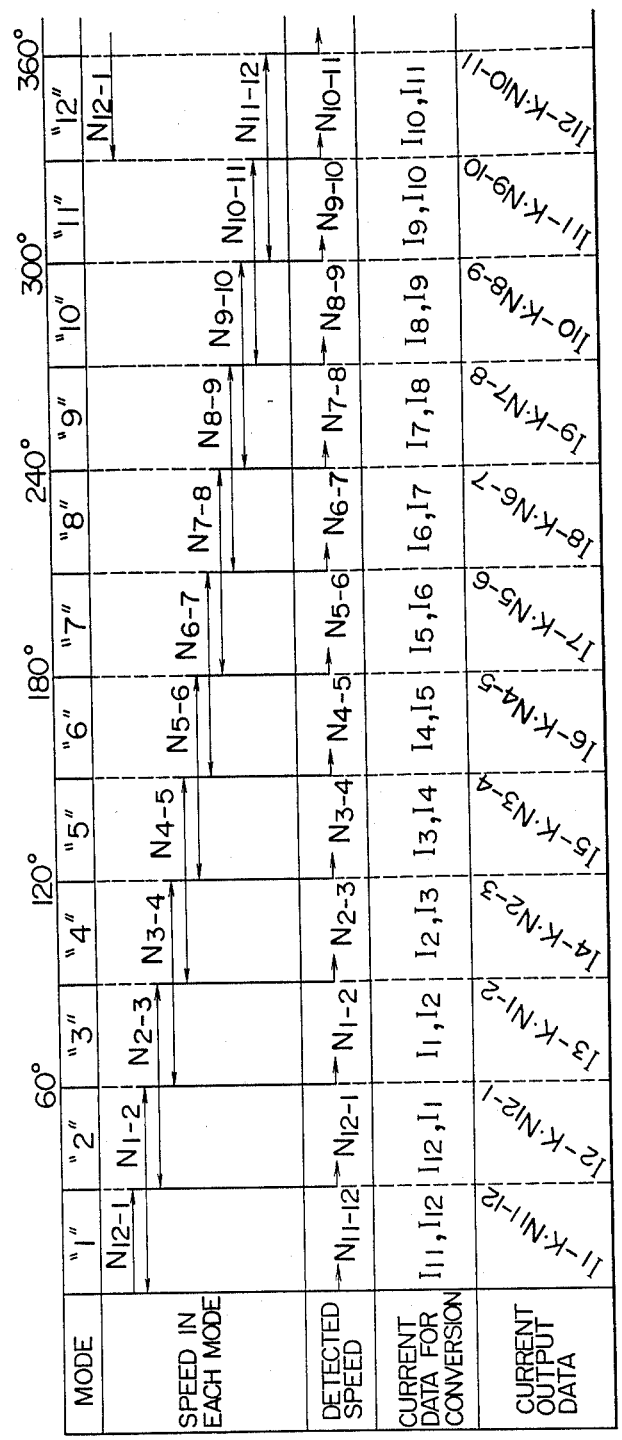
FIG. 7 is a diagram useful in explaining the operation in the speed controlling shown in FIG. 6.

Like FIG. 5, FIG. 7 is useful to explain the operation by illustrating periods for measurement of speeds to be detected, contents of detection speeds, integration terms representative of current data for correction, and current output data.

A speed detectable at a given mode "i" is a speed $N_{(i-2)-(i-1)}$ over modes "i−1" and "i−2" (for i=1, modes "11" and "12" or for i=2, modes "12" and "1"), and the thus detected speed $N_{(i-2)-(i-1)}$ and an internal speed command INCMD at a corresponding instant, i.e., at the mode "i" are used to correct two integration terms of follows:

$$I_{i-2} = (\text{INCMD} - N_{(i-2)-(i-1)}) + I_{i-2} \quad (3)$$

where the integration terms $I_{i-2}$ and $I_{i-1}$ in the right side represent, as in equation (1), integration terms as determined in the modes "i−2" and "i−1" prior to the corresponding instant.

A current output data 11 at the mode "i" is represented by a difference between an integration term $I_i$ which has been corrected at modes "i+1" and "i+2" that precede the mode "i" and a proportional term $P = K \cdot N_{(i-2)-(i-1)}$, resulting in $I_i - K \cdot N_{(i-2)-(i-1)}$.

Even when the time for each 30° mechanical angle represented by the position detection signal 6S and used for speed detection depends on accuracies of parts constituting the magnetic pole position detecting circuit 6 and fails to correctly reflect the speed, the second embodiment of FIGS. 6 and 7, in which the speed is detected with high accuracies on the basis of the time for each 60° mechanical angle and used to correct the two integration terms, can minimize the influence of the accuracies of parts upon the current output data.

To obtain the same effect as the second embodiment, it is also conceivable that a single integration term is corrected and two integration terms are reflected in the current output data.

To be specific, only an integration term $I_{i-2}$ is used as the integration term to be corrected at the mode "i" and two integration terms $I_i$ and $I_{i-1}$ are so selected as to be reflected in the current output data to provide $(I_i + I_{i-1}) - K \cdot N_{(i-2)-(i-1)}$ as the current output data, thereby attaining the same effect.

A third embodiment of a method of correcting and outputting the current data to be stored in the current pattern storage area will be described with reference to FIGS. 8 and 9.

In these figures, identical parts to those of FIGS. 4 and 5 are designated by identical reference numerals, with a microcomputer and a current pattern storage area being denoted by 7-B and 7-3b-2, respectively.

This third embodiment differs from the previous embodiments in that in addition to the integration terms, 12 proportional terms are prepared and 12 pieces of current data composed of pairs of integration term and proportional term are prepared which correspond to 12 modes.

Figure 8:
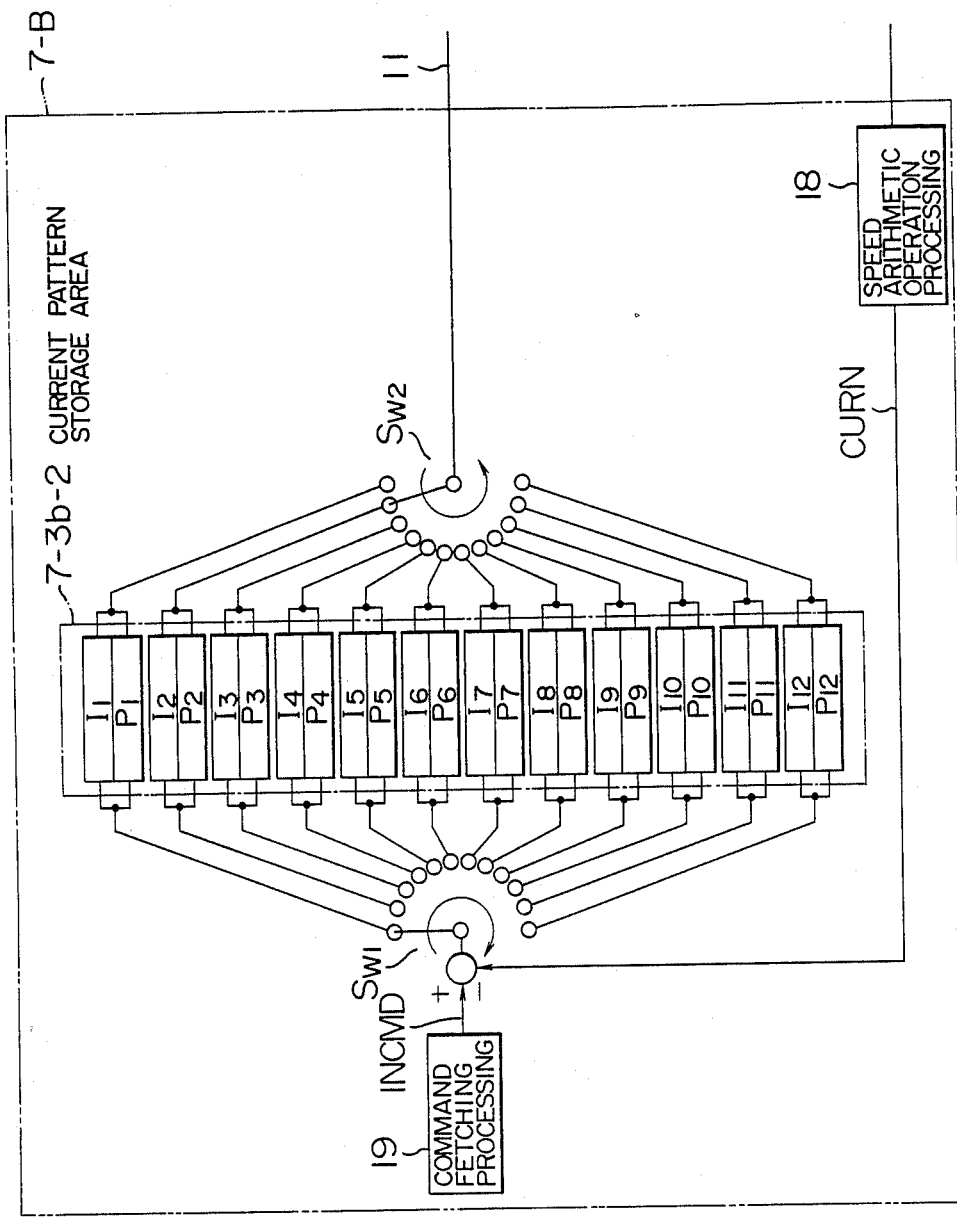
FIG. 8 is a block diagram detailing still another embodiment of speed controlling with the FIG. 1 apparatus.

Like FIG. 4, FIG. 8 shows, in block form, contents of processings to be performed for speed controlling with the microcomputer 7-B.

Specifically, 12 integration terms $I_1$ to $I_{12}$ and 12 proportional terms $P_1$ to $P_{12}$ are paired with each other to provide 12 pieces of current data which constitute the current pattern storate area 7-3b-2.

The respective paired proportional and integration terms are corrected, at every 30° revolving position, by the switch $SW_1$ and selected by the switch $SW_2$ so as to produce a current output data 11 which is delivered out of the microcomputer 7-B.

Like FIG. 5, FIG. 9 is useful to explain the operation by illustrating detected speeds, proportional and integration terms for correction of current data, and current output data at the respective modes corresponding to the respective 30° revolving positions.

A speed detectable at a given mode "i" is $N_{i-1}$ (for i=1,$N_{12}$), and the thus detected speed $N_{i-1}$ and an internal speed command INCMD at a corresponding instant are used to prepared a proportional term $P_{i-1}$ as follows:

$$P_{i-1} = K(\text{INCMD} - N_{i-1}).$$

The integration term $I_{i-1}$, on the other hand, is corrected pursuant to equation (1) as in the previous embodiment.

A current output data to be delivered out at the mode "i" is represented by a sum of an integration term $I_i$ which has already been corrected at a mode "i+1" that precedes by about one revolution and a proportional term $P_i$, resulting in $I_i + P_i$.

Since in this embodiment the proportional term and integration term are prepared based on the speed at the same mode, the current output data 11, i.e., an analog current command value indicative of a pattern of motor output torque over one revolution can highly approximate a pulsating pattern of load on the compressor to thereby enhance reduction of speed pulsation.

In the foregoing embodiments, the brushless DC motor is used as the compressor motor and controlled in speed to attain effects summarized as below.

(1) With respect to the pulsating load pattern having a period of one revolution and substantially determined by revolving positions, the revolving position of the rotor is divided into twelve divisions at the rate of 30°, the speed is detected at every division of revolving position, the current data relevant to winding current is corrected on the basis of a difference between the detected speed and a command speed and stored in the read/write RAM, and the winding current, i.e., output torque of the brushless DC motor is controlled in accordance with the stored current data. Consequently, the output torque pattern having a period of one revolution approximates the twelve divisions of the pulsating or changing load pattern.

It follows therefore that the difference between loading torque on the compressor and output torque of the motor can be minimized to efficiently reduce speed pulsation due to the torque difference.

This ensures that even when the operation range of the compressor motor is extended to a low speed operation of 1,000 rpm or less, the motor driven compressor can be freed from vibrations.

(2) Moreover, since as described previously the output torque pattern of the motor can be prepared using only the rotor magnetic pole position detecting signal obtained from armature winding terminal voltages, any sensor for detection of a revolving reference position or any sensor such as tachometer and encoder for speed detection need not be provided for the motor in order to match the output torque pattern and the load torque pattern in respect of revolution angles, and therefore an increase in the number of parts can be prevented to improve reliability.

To control the brushless DC motor, a special method is employed as will be described below with reference to the speed control apparatus of FIG. 1 and FIGS. 10 to 14.

Figure 10:
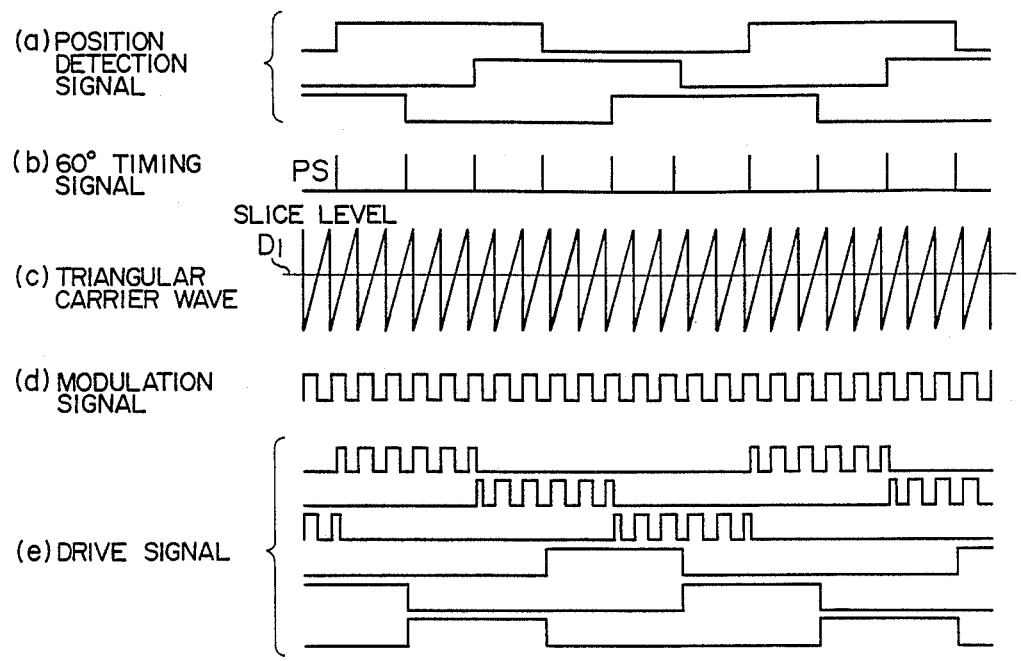
FIG. 10 is a diagram showing various signal waveforms useful to explain the operation of the FIG. 1 apparatus.

In operating the brushless DC motor, various signal waveforms as shown in FIG. 10 occur in the main circuit of the apparatus. More specifically, the position detection signals 6S outputted from the magnetic pole position detecting circuit 6 take waveforms as shown at section (a) in FIG. 10, a timing signal PS for, for example, an electrical angle of 60° is illustrated at (b) in FIG. 10, and a triangular carrier wave as shown at (c) has a fixed oscillation frequency. Illustrated at (d) in FIG. 10 is a modulation signal generated at a slice level $D_1$ shown in the triangular carrier wave. Also, illustrated at (e) in FIG. 10 is a drive signal for the transistors which is generated through a logical processing of the modulation signal and the position detection signals 6S shown at (a). The revolution number of the brushless DC motor is determined by changing the output voltage of the inverter 4 in accordance with the slice level $D_1$.

Figure 11:
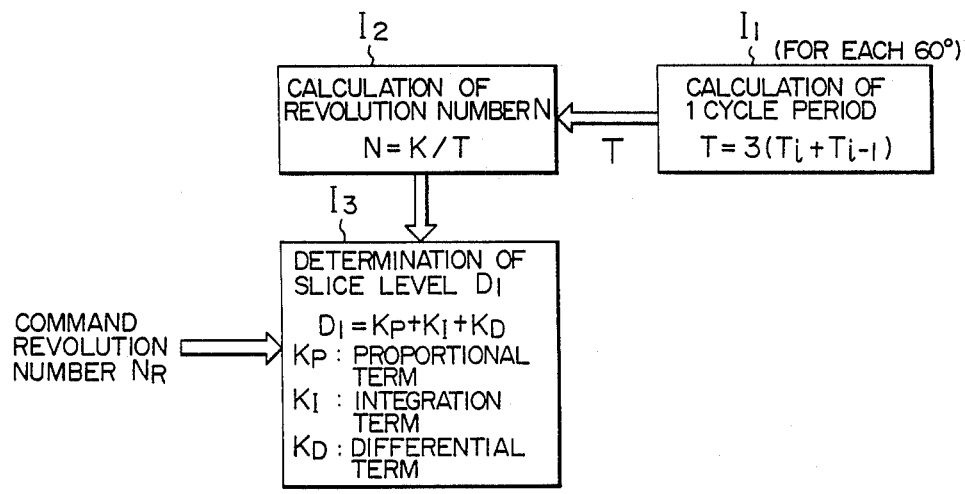
FIG. 11 is a systematic block diagram of a control system showing a speed control method according to an embodiment of the invention.

In describing the speed control method according to this embodiment, reference should be made to FIG. 11 which depicts a systematic diagram of controlling based on the control circuit shown in FIG. 1. Thus, in a processing $I_1$ of FIG. 11, a time T for one cycle of controlling is first computed by tripling a time for two periods $(T_i + T_{i-1})$ of the timing signal PS occurring at the rate of 60° electrical angle (see (b) in FIG. 10), a revolution number N is then computed pursuant to $N = K/T$ where K is constant in a processing $I_2$, and in a processing $I_3$ a proportional term $K_P$, integration term $K_I$ and differential term $K_D$ of a difference revolution number between a detected revolution number N and a command revolution number $N_R$ are determined and the slice level $D_1$ is determined by a sum $(K_P + K_I + K_D)$. The processings $I_1$, $I_2$ and $I_3$ are performed with the microcomputer 7 included in the control circuit at the rate of the time for 60° electrical angle in synchronism with the signal PS.

Figure 12:
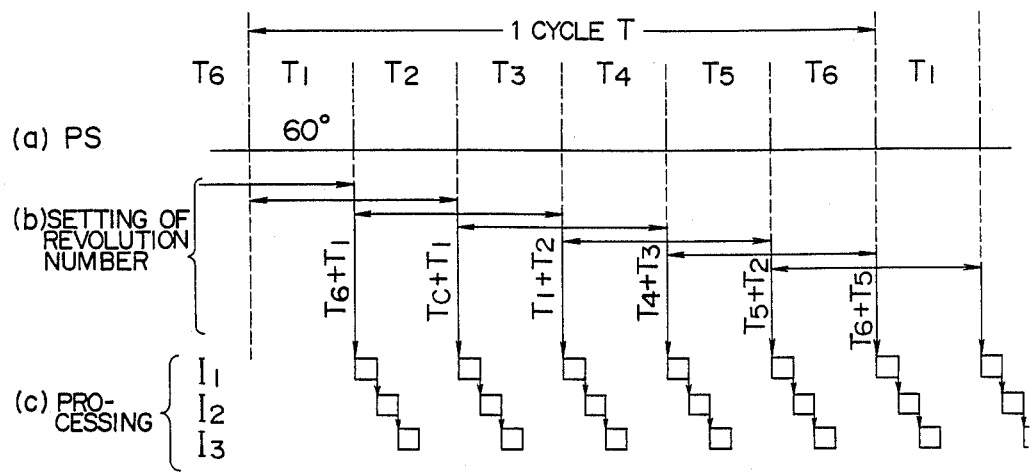
FIG. 12 is a time chart for execution of the FIG. 11 speed controlling.

Time relationship between the signal PS and the above processings is illustrated in FIG. 12. The processings $I_1$, $I_2$ and $I_3$ in sequence are carried out at a time at the rate of the time for 60° electrical angle. On the other hand, times over an electrical angle of 120° corresponding to two periods of an updated signal PS are used as the information necessary for computation 10 of the revolution number each time the processing $I_1$ is executed.

According to this method, the information for the revolution number over the two periods of the signal PS permits that unevenness in measured values occurring at the rate of one period can be averaged and measurement results over the time for the two periods can immediately be reflected in the slice level $D_1$, thereby making it possible to improve accuracies in the detected revolution number and to increase the response speed of the speed control system to changes in the revolution number.

Figure 13:
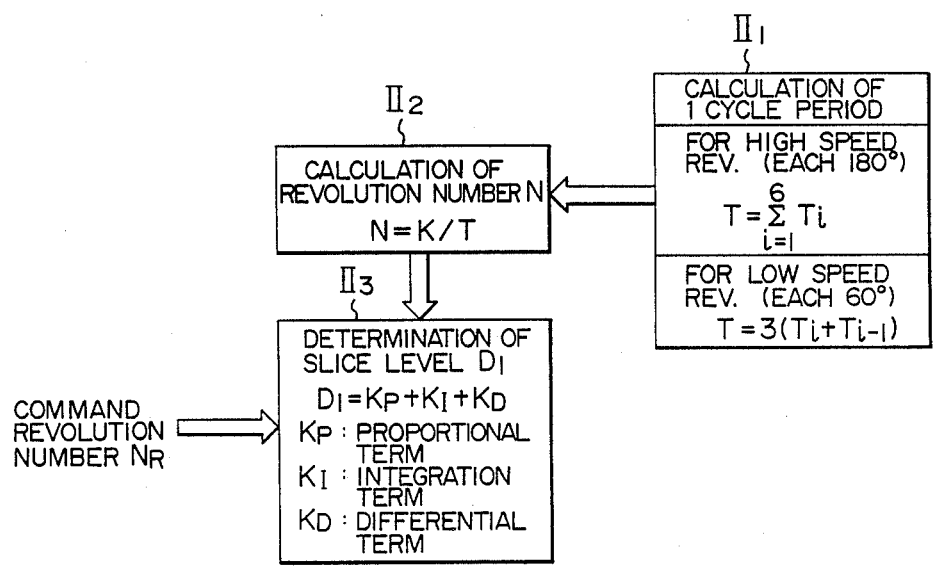
FIG. 13 is a systematic block diagram of a control system showing a speed control method according to another of the invention.

A modification of the embodiment as explained with reference to FIGS. 11 and 12 will be described by referring to FIGS. 13 and 14. FIG. 13 is a systematic diagram useful to explain speed controlling according to this modification. With the exception that in a processing $II_1$, computation of the time T for one cycle is carried out in different manners for high revolutions and low revolutions and the execution period for processing $II_1$, $II_2$ and $II_3$ in sequence is changed for high revolutions or low revolutions, the control system of FIG. 13 has the same contents of processings $II_2$ and $II_3$ as those of processings $I_2$ and $I_3$ in FIG. 11.

To explain, an amount of time is required for the speed controlling performed with the microcomputer and when one period for the signal PS is shortened under high revolutions, the speed control processing becomes difficult to complete within the one period. To eliminate this problem, according to this embodiment of FIGS. 13 and 14, processings necessary for speed controlling are executed at the rate of these periods of the signal PS corresponding to an electrical angle of 180°. In addition, since under high revolutions unevenness of component parts of the position detecting circuit relevant to the position detection signal has great influence upon unevenness in the period of the signal PS, times over an electrical angle of 360° corresponding to six periods of an updated signal PS are used as the averaged information necessary for computation of the revolution number each time the processing $II_1$ is executed.

Figure 14:
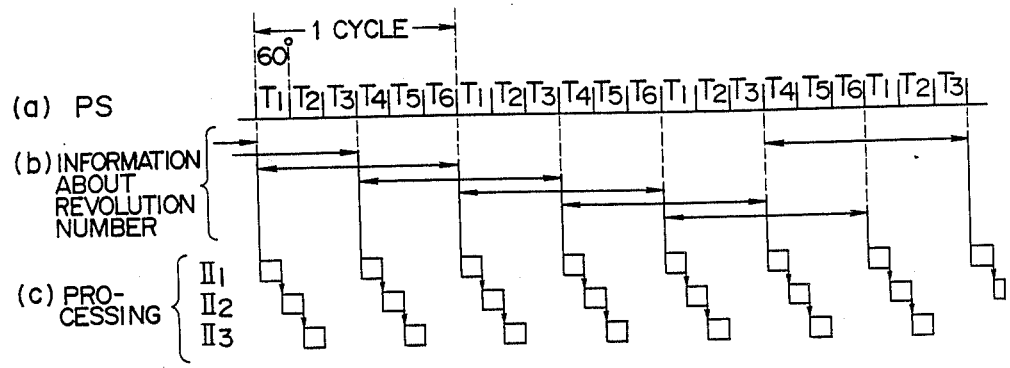
FIG. 14 is a time chart for execution of the FIG. 13 speed controlling.
Figure 15:
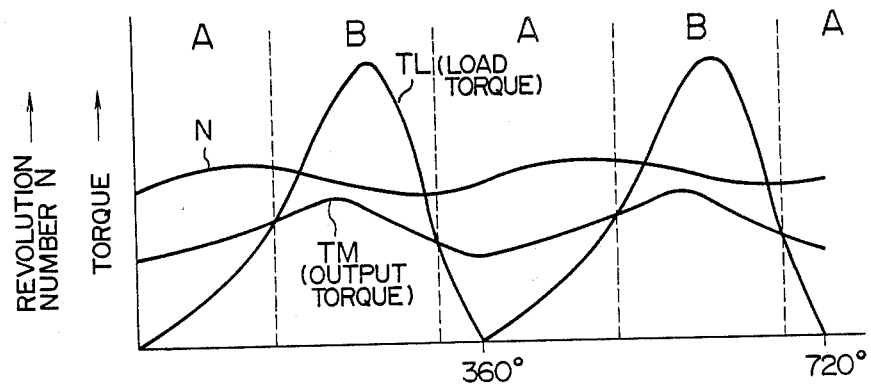
FIG. 15 is a graphical representation illustrating charges in load torque, output torque of the motor and revolution number in relation to revolving angles of the motor.

Time relationship between the signal PS and the above processings $II_1$, $II_2$ and $II_3$ under high revolutions is illustrated in FIG. 14. These processings in sequence are carried out at the rate of the time for 180° electrical angle in synchronism with the signal PS, and times over a time corresponding to six periods of an updated signal PS are used as the information necessary for computation of the revolution number each time the processing $II_1$ is executed.

In the foregoing embodiments, the invention has been described by referring to the brushless DC motor standing for the motor for use with compressors but this invention is in no way limited to this type of motor. In general, the invention is applicable to a speed control apparatus for a motor which drives a load that varies within a fixed period and which is provided with a device capable of detecting changes in speed within the fixed period and of controlling current and voltage applied to the motor to control the speed.

Although in the foregoing embodiments the current supplied to the motor is controlled to control the revolution number, controlling of the revolution number may be effected by controlling the voltage applied to the motor.

Moreover, the inverter used as the current control device in the foregoing embodiments may be replaced with a chopper device for use in a DC power supply. Also, the DC power supply and the chopper device may be used in combination to set up a voltage control device.

It should also be understood that the invention is also applicable to a linear motor which is movable linearly.

Briefly, the invention is implemented with a drive motor whose loading torque varies at a predetermined period.

As described above, the speed control apparatus for motor according to the invention is suitable for changing the speed of motor over a wide range in accordance with the command speed and for minimizing the speed pulsation. Further, the invention can be implemented by detecting only the speed without resort to detection of a position to which the movement of the load is referenced and besides it is not necessary that in the invention the amount of change in the load which changes within the fixed period be known in advance, thus giving rise to great advantage to industrial utilization.

The speed control method according to the invention is implemented by controlling the speed at the rate of the time for 60 $n_2$ electrical angle of the position detection signal and so, especially advantageously used in an application to the brushless DC motor for driving compressors wherein the load pulsates in relation to revolving positions, in order that changes in revolution number due to changes in load can rapidly be reflected in the inverter output voltage to permit the speed control system to have high response, with consequent realization of a brushless DC motor of less revolving pulsation. According to the modified embodiment of the invention, under high revolutions wherein changes in revolution number due to changes in load are relieved by an increase in inertial force due to the load and motor, $n_2$ is made larger than that under low revolutions in consideration of the processing time of the speed control system, to ensure that the revolving pulsation can similarly be suppressed and at the same time the response characteristic can be improved.

We claim:

1. A speed control apparatus for a motor which drives a load device with a periodical change of its load in response to a speed command, comprising:
    a control unit for controlling current or voltage supplied to said motor from a power source on the basis of a current command or voltage command corresponding to a desired speed of said motor;
    means for dividing each period of said change of load into at least n divisions, where $n=2$;
    means for detecting motor speed at each of said n divisions;
    read/write storage means for independently storing n pieces of current command data or voltage command data corresponding to said n divisions;
    means for comparing said speed command with said motor speed detected by said detecting means to determine the deviation between said motor speed and said speed command and for then rewriting said data in said storage means at each of said n divisions in accordance with the determined deviation so as to decrease the deviation; and
    means for producing said current command or said voltage command according to said current command data or said voltage command data at each of said n divisions so as to provide said current command or said voltage command to said control unit.

2. A speed control apparatus according to claim 1 wherein said motor is an AC motor and said control unit for controlling voltage or current supplied to said motor is an inverter device.

3. A speed control apparatus according to claim 1 wherein said motor is an AC motor of a synchronous type with a permanent field magnet, said predetermined period corresponds to one revolution, and the number of divisions is represented by a product of phase number and pole number of the synchronous motor.

4. A speed control apparatus according to claim 1 wherein said motor is a linear motor which is movable linearly.

5. A speed control apparatus according to claim 2 wherein said motor is a linear motor which is movable linearly.

6. A speed control apparatus according to claim 1 wherein or current command is derived from position signals delivered out of a magnetic pole position detecting circuit provided for said motor.

7. A speed control apparatus according to claim 2 wherein said voltage or current command is derived from position signals delivered out of a magnetic pole position detecting circuit provided for said motor.

8. A speed control apparatus according to claim 3 wherein a voltage or current command is derived, from position signals delivered out of said magnetic pole position detecting circuit provided for said motor.

9. A speed, control apparatus according to claim 4 wherein said voltage or current command is derived from position signals delivered out of a magnetic pole position detecting circuit provided for said motor.

10. A speed control apparatus according to claim 5 wherein said voltage or current command is derived from position signals delivered out of a magnetic pole position detecting circuit provided for said motor.

11. A speed control apparatus according to claim 1 wherein said read/write storage means is a RAM included in a microcomputer, a plurality of pieces of current data are stored in said RAM, a piece of digital current data is outputted from said microcomputer on the basis of one current data selected from the plurality of pieces of current data in relation to a revolving position of said motor, and the digital current data is converted by a D/A converter into an analog signal representative of a current signal supplied to said motor.

12. A speed control method for a motor which drives a load device with a periodical change of its load in response to a speed command, comprising the steps of:
    dividing each period of said change of load into at least n divisions, where $n=2$;
    detecting actual motor speed at each of said n divisions;
    storing n pieces of current command data or voltage command data in a read/write storage device corresponding to said n divisions;
    comparing said speed command with said motor speed detected by said detecting means to determine the deviation between said motor speed and said speed command and then rewriting said data in said storage device at each of said n divisions in accordance with the determined deviation so as to decrease the deviation;
    producing said current command or said voltage command according to said current command data or said voltage command data at each of said n divisions; and
    controlling current or voltage supplied to said motor from a power source according to said current command or said voltage command.

* * * * *